United States Patent
Jing et al.

(10) Patent No.: US 11,527,951 B2
(45) Date of Patent: Dec. 13, 2022

(54) REVERSE X2 MODE CHARGE PUMP SOFT START

(71) Applicant: QUALCOMM Incorporated, San Diego, CA (US)

(72) Inventors: Yue Jing, San Jose, CA (US); Sanghwa Jung, Los Gatos, CA (US); David Wong, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/125,571

(22) Filed: Dec. 17, 2020

(65) Prior Publication Data

US 2021/0194358 A1 Jun. 24, 2021

Related U.S. Application Data

(60) Provisional application No. 62/951,330, filed on Dec. 20, 2019.

(51) Int. Cl.
| | |
|---|---|
| *H02M 1/36* | (2007.01) |
| *H02M 3/07* | (2006.01) |
| *H02M 3/158* | (2006.01) |

(52) U.S. Cl.
CPC ............ *H02M 3/07* (2013.01); *H02M 1/36* (2013.01); *H02M 3/158* (2013.01)

(58) Field of Classification Search
CPC ........... H02M 1/36; H02M 3/07; H02M 3/158

USPC ........................................................ 327/536
See application file for complete search history.

(56) References Cited

U.S. PATENT DOCUMENTS

| | | | | |
|---|---|---|---|---|
| 10,447,152 | B2* | 10/2019 | Zhang ................. | H02M 7/4833 |
| 2016/0240130 | A1* | 8/2016 | Nishimura ............. | G09G 3/006 |
| 2017/0353105 | A1* | 12/2017 | Solie ....................... | H02M 1/36 |
| 2019/0028031 | A1* | 1/2019 | Scoones .............. | H02M 3/1588 |
| 2019/0115829 | A1* | 4/2019 | Oporta .................... | H02J 7/022 |

* cited by examiner

*Primary Examiner* — William Hernandez
(74) *Attorney, Agent, or Firm* — Patterson+ Sheridan, L.L.P.

(57) ABSTRACT

Certain aspects of the present disclosure generally relate to soft starting a switched-mode power supply (SMPS) circuit operating as a charge pump in a reverse multiply-by-two mode. One example SMPS circuit generally includes a plurality of transistors, a capacitive element coupled to the plurality of transistors, and a current sink coupled between the capacitive element and a reference potential node for the SMPS circuit. For certain aspects, the current sink is configured to be enabled during a first phase of a soft start operation for the SMPS circuit, but is configured to be disabled during a second phase of the soft start operation and during normal operation for the SMPS circuit.

30 Claims, 11 Drawing Sheets

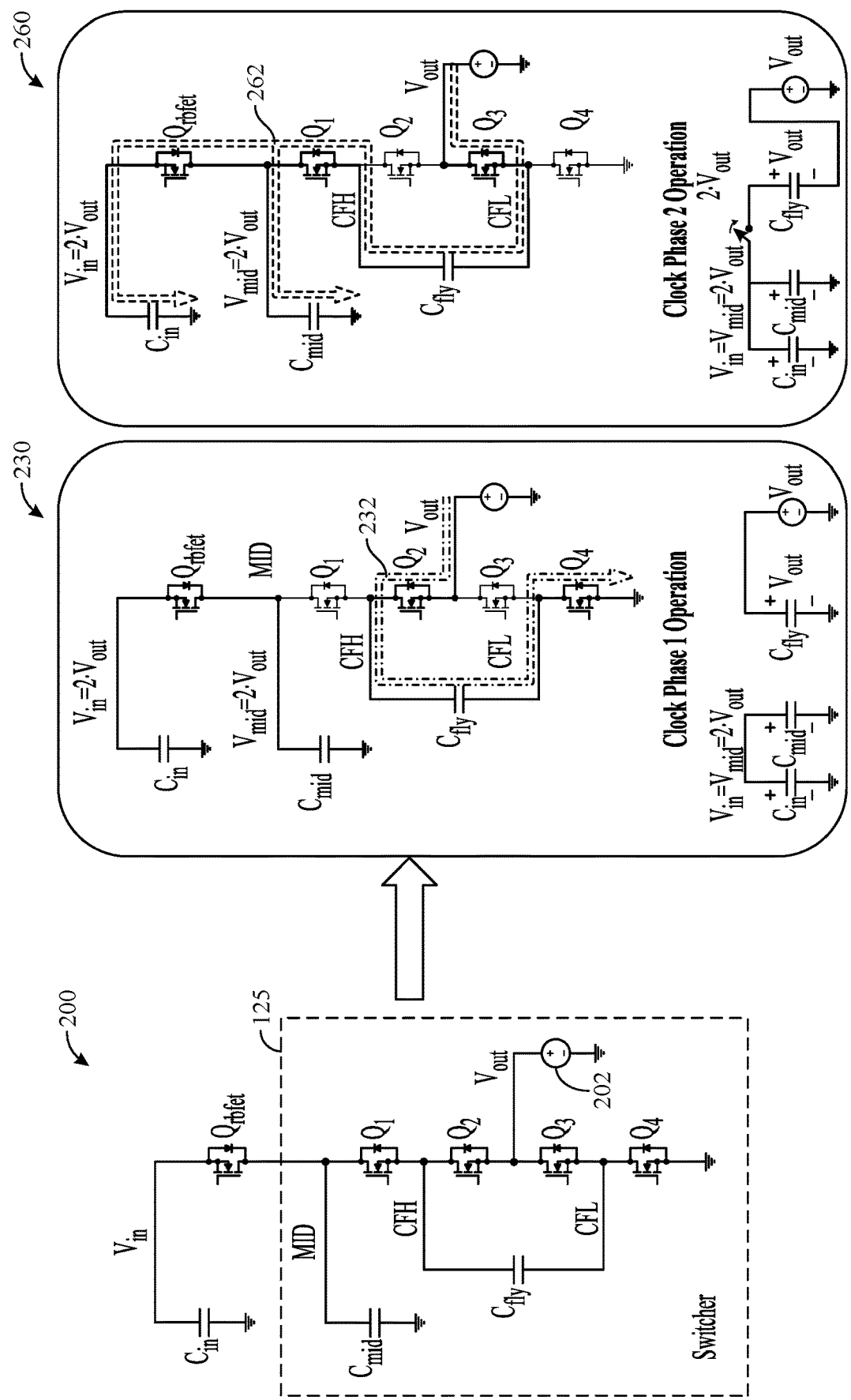

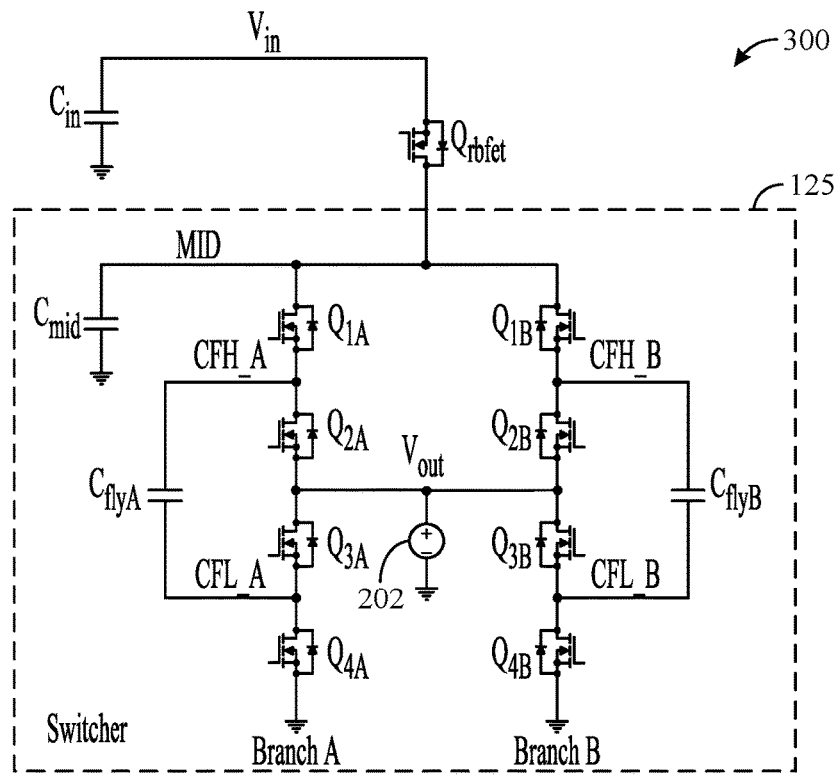
FIG. 3A
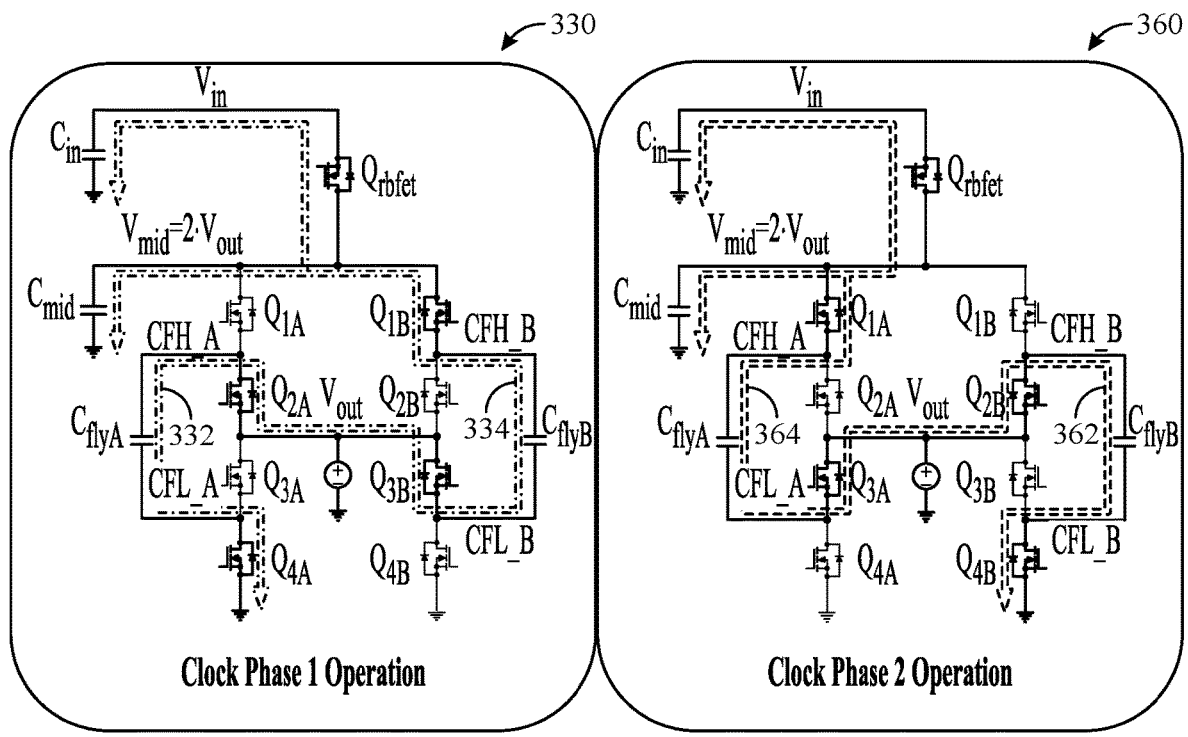
FIG. 3B
FIG. 3C

REVERSE X2 MODE CHARGE PUMP SOFT START

CROSS-REFERENCE TO RELATED APPLICATION(S)

This application claims the benefit of priority to U.S. Provisional Application No. 62/951,330, entitled "Reverse X2 Mode Charge Pump Soft Start" and filed Dec. 20, 2019, which is expressly incorporated by reference herein in its entirety as if fully set forth below and for all applicable purposes.

TECHNICAL FIELD

Certain aspects of the present disclosure generally relate to electronic circuits and, more particularly, to methods and apparatus for soft starting a switched-mode power supply circuit operating as a charge pump in a reverse multiply-by-two (X2) mode.

BACKGROUND

A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator (or "switcher") may be implemented, for example, by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches are typically implemented with transistors, although the low-side switch may alternatively be implemented with a diode.

A charge pump is a type of SMPS typically comprising at least one switching device to control the connection of a supply voltage across a load through a capacitor. In a voltage doubler, for example, the capacitor of the charge pump circuit may initially be connected across the supply, charging the capacitor to the supply voltage. The charge pump circuit may then be reconfigured to connect the capacitor in series with the supply and the load, doubling the voltage across the load. This two-stage cycle is repeated at the switching frequency for the charge pump. Charge pumps may be used to multiply or divide voltages by integer or fractional amounts, depending on the circuit topology.

Power management integrated circuits (power management ICs or PMICs) are used for managing the power requirement of a host system and may include and/or control one or more voltage regulators (e.g., buck converters or charge pumps). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure provide a switched-mode power supply circuit. The switched-mode power supply circuit generally includes a plurality of transistors, a capacitive element coupled to the plurality of transistors, and a current sink coupled between the capacitive element and a reference potential node for the switched-mode power supply circuit.

Certain aspects of the present disclosure are directed to a power supply circuit comprising a switched-mode power supply circuit and a current sink. The switched-mode power supply circuit generally includes a first transistor, a second transistor coupled to the first transistor via a first node, a third transistor coupled to the second transistor via a second node, a fourth transistor coupled to the third transistor via a third node; and a capacitive element having a first terminal coupled to the first node and having a second terminal coupled to the third node. The current sink is coupled between the third node and a reference potential node for the switched-mode power supply circuit.

Certain aspects of the present disclosure provide a power management integrated circuit (PMIC) comprising at least a portion of the switched-mode power supply circuit described above.

Certain aspects of the present disclosure provide a battery charging circuit comprising the switched-mode power supply circuit described above.

Certain aspects of the present disclosure provide a method of supplying power. The method includes soft starting a power supply circuit and operating the power supply circuit in a normal steady state. The power supply circuit includes a switched-mode power supply circuit and a current sink. The switched-mode power supply circuit generally includes a first transistor, a second transistor coupled to the first transistor via a first node, a third transistor coupled to the second transistor via a second node, a fourth transistor coupled to the third transistor via a third node; and a capacitive element having a first terminal coupled to the first node and having a second terminal coupled to the third node. The current sink is coupled between the third node and a reference potential node for the switched-mode power supply circuit.

Certain aspects of the present disclosure provide a method of supplying power. The method includes soft starting a switched-mode power supply circuit and operating the switched-mode power supply circuit in a normal steady state. The soft starting generally includes enabling a current sink coupled to the switched-mode power supply circuit during a first phase of the soft starting and disabling the current sink during a second phase of the soft starting.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 2A is a schematic diagram of an example single branch charge pump circuit.

FIGS. 2B and 2C illustrate different operation phases of the charge pump circuit of FIG. 2A in a reverse X2 mode.

FIG. 3A is a schematic diagram of an example dual branch charge pump circuit.

FIGS. 3B and 3C illustrate different operation phases of the charge pump circuit of FIG. 3A in a reverse X2 mode.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
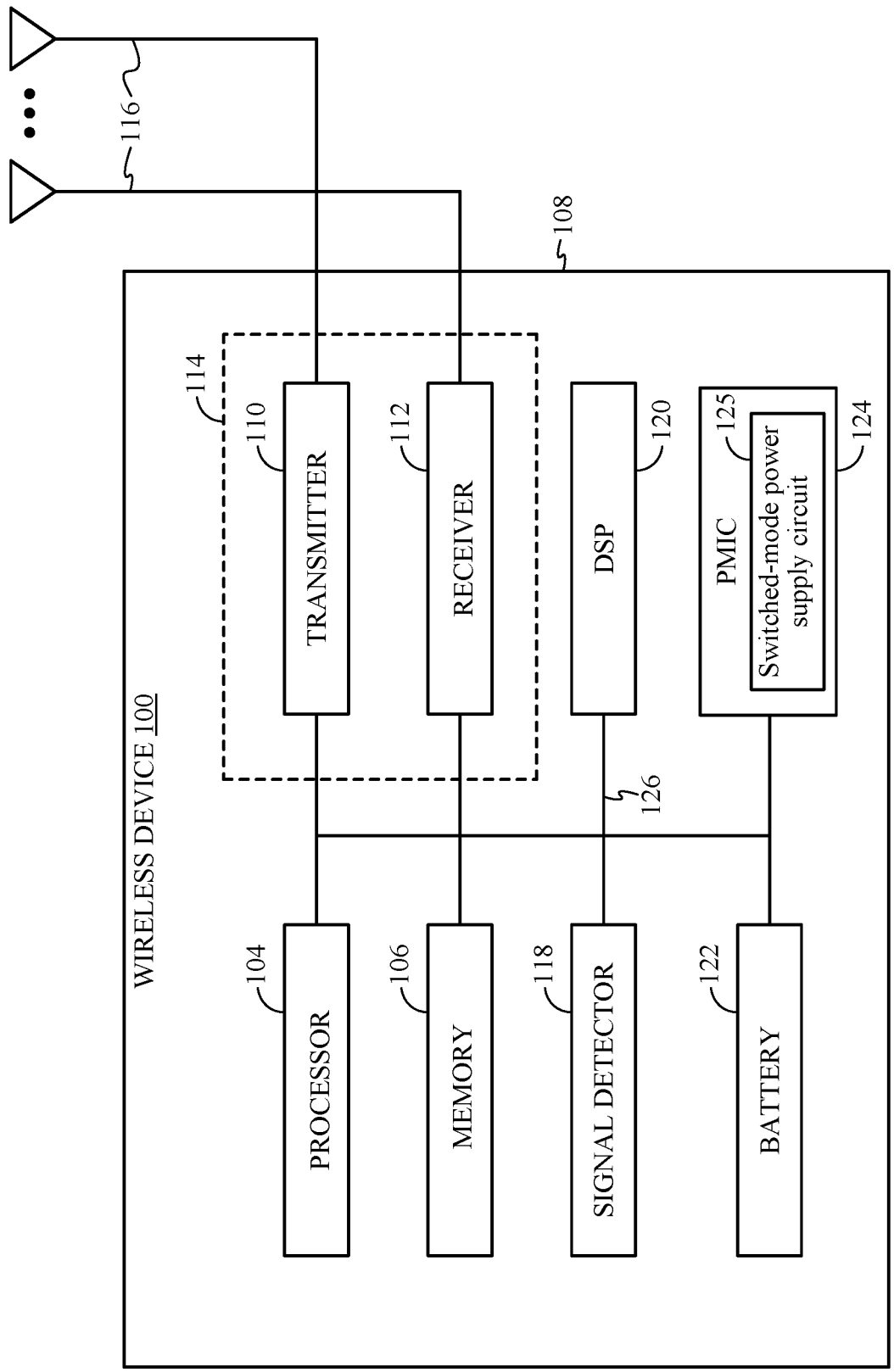
FIG. 1 is a block diagram of an example device comprising a power management integrated circuit (PMIC) that includes a switched-mode power supply circuit capable of operating as a charge pump in a reverse multiply-by-two (X2) mode, in accordance with certain aspects of the present disclosure.

Certain aspects of the present disclosure provide techniques and apparatus for soft starting a switched-mode power supply circuit capable of operating as a charge pump in a reverse multiply-by-two (X2) mode. In reverse X2 mode operation, the input voltage (or technically speaking, what would be considered the input voltage in a forward mode of operation) will be boosted up to two times that of the output voltage ($V_{out}$) (or more accurately, what would be considered the output voltage in the forward mode). Certain aspects of the present disclosure provide a practical way to gradually increase a middle input voltage ($V_{mid}$) at a middle input voltage node (MID) from $V_{out}$ to $2*V_{out}$ and raise the input voltage ($V_{in}$) from 0 V to $2*V_{out}$. With this soft start feature, excessive startup current and large voltage changes can be avoided during reverse X2 start up.

When an electronic power supply circuit is suddenly turned on, large startup currents (also referred to as "inrush currents") may flow in the circuit due to the initial charging of capacitors and inductors. As used herein, the term "soft starting" (or a "soft start operation") generally refers to gradually turning on the electronic power supply circuit, such as by progressively increasing the startup current (e.g., from zero to the final value) and allowing the output voltage to rise gradually. A soft start may avoid stressing the circuit components with the large startup currents and/or voltage surges associated with a sudden power on of the electronic power supply circuit.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 may include at least a portion of a switched-mode power supply circuit 125. The switched-mode power supply circuit 125 may be implemented by any of various suitable switched-mode power supply circuit topologies, such as a charge pump circuit capable of operating in a reverse multiply-by-two (X2) mode (e.g., the charge pump circuit 200 of FIG. 2A). For certain aspects, the PMIC 124 may include a battery charging circuit (e.g., a master-slave battery charging circuit).

The various components of the device 100 may be coupled together by a bus system 126, which may include a power bus, a control signal bus, and/or a status signal bus in addition to a data bus.

Example Reverse X2 Mode Charge Pump Soft Start

FIG. 2A is a schematic diagram of an example single branch charge pump circuit 200. The charge pump circuit 200 may function as a divide-by-two (Div2) charge pump that may be used in a reverse multiply-by-two (X2) mode when energy transfers from output to input.

The charge pump circuit 200 may include a plurality of switching devices (e.g., implemented by a first transistor $Q_1$, a second transistor $Q_2$, a third transistor $Q_3$, and a fourth transistor $Q_4$) and a flying capacitive element $C_{fly}$. Transistor $Q_2$ may be coupled to transistor $Q_1$ via a first node (labeled "CFH" for flying capacitor high node), transistor $Q_3$ may be coupled to transistor $Q_2$ via a second node (labeled "$V_{out}$" for the output voltage node), and transistor $Q_4$ may be coupled to transistor $Q_3$ via a third node (labeled "CFL" for flying capacitor low node). For certain aspects, the transistors $Q_1$-$Q_4$ may be implemented as n-type metal-oxide-semiconductor (NMOS) transistors, as illustrated in FIG. 2A. In this case, the drain of transistor $Q_2$ may be coupled to the source of transistor $Q_1$, the drain of transistor $Q_3$ may be coupled to the source of transistor $Q_2$, and the drain of transistor $Q_4$ may be coupled to the source of transistor $Q_3$. The flying capacitive element $C_{fly}$ may have a first terminal coupled to the first node and a second terminal coupled to the third node. The source of transistor $Q_4$ may be coupled to a reference potential node (e.g., electric ground) for the charge pump circuit 200. The drain of transistor $Q_1$ may be coupled to a middle input voltage node (labeled "MID"), which may have a decoupling capacitive element Ca coupled thereto. An input voltage ($V_{in}$) node may be coupled to the MID node via a reverse-blocking field-effect transistor ($Q_{rbfet}$, also known as a front-porch FET). Transistor $Q_{rbfet}$ may have a drain coupled to the drain of transistor $Q_1$ and may have a source coupled to the $V_{in}$ node. The $V_{in}$ node may have a decoupling capacitive element $C_{in}$ coupled thereto.

FIGS. 2B and 2C illustrate different operation phases (Clock Phases 1 and 2) of the charge pump circuit 200 of FIG. 2A in the reverse X2 mode during steady state. In reverse X2 mode steady state operation, transistor $Q_{rbfet}$ is kept on in both clock phases to pass energy from the MID node to the $V_{in}$ node. The switching devices (power FETs $Q_1$, $Q_2$, $Q_3$, and $Q_4$) are switching to generate a MID voltage ($V_{mid}$)=2*$V_{out}$ from a $V_{out}$ voltage source 202 (e.g., a battery, such as the battery 122, of a portable device, such as the device 100).

During the first clock phase 230 (Clock Phase 1) shown in FIG. 2B, transistors $Q_2$ and $Q_4$ are on, while transistors $Q_1$ and $Q_3$ are off. Thus, current 232 flows from the $V_{out}$ voltage source 202 to charge the flying capacitive element $C_{fly}$ through transistors $Q_2$ and $Q_4$. With this configuration, $C_{fly}$ is in parallel with the $V_{out}$ voltage source 202, and the voltage at the CFH node ($V_{cfh}$=$V_{cfly}$, the voltage across $C_{fly}$) is equal to $V_{out}$. Also, during the first clock phase 230 with transistor $Q_1$ off, $V_{mid}$ and $V_{in}$ remain equal to 2*$V_{out}$, as explained below. These concepts are illustrated in the equivalent circuit below the schematic diagram illustrating the first clock phase 230.

During the second clock phase 260 (Clock Phase 2) depicted in FIG. 2C, transistors $Q_1$ and $Q_3$ are on, while transistors $Q_2$ and $Q_4$ are off. Thus, current 262 flows from the $V_{out}$ voltage source 202 to charge $C_{mid}$ and $C_{in}$ through $C_{fly}$ and transistors $Q_1$ and $Q_3$. In this configuration, $C_{fly}$ is in series with the $V_{out}$ voltage source 202, such that $V_{mid}$ and $V_{in}$ are equal to 2*$V_{out}$, due to $V_{cfly}$ being charged to $V_{out}$ during the first clock phase 230. These concepts are illustrated in the equivalent circuit below the schematic diagram illustrating the second clock phase 260.

As explained above, when the charge pump circuit 200 operates in a reverse multiply-by-two (X2) mode steady state, $V_{mid}$ and $V_{in}$ are boosted up to $2*V_{out}$, where $V_{out}$ is the output voltage of the charge pump circuit in forward mode. However, before start up, the highest supply voltage is $V_{out}$. Thus, it may be challenging to prebias the $V_{in}$ and MID nodes to $2*V_{out}$ before start up.

FIG. 3A is a schematic diagram of an example dual branch charge pump circuit 300 with Branches A and B. FIGS. 3B and 3C illustrate different operation phases (Clock Phases 1 and 2) of the dual branch charge pump circuit 300 of FIG. 3A in a reverse X2 mode during steady state.

In reverse X2 mode steady state operation, $Q_{rbfet}$ is kept on during both clock phases to pass energy from the MID node to the Vin node. The switching devices (e.g., power FETs $Q_{1A}$, $Q_{2A}$, $Q_{3A}$, $Q_{4A}$ of Branch A and $Q_{1B}$, $Q_{2B}$, $Q_{3B}$, $Q_{4B}$ of Branch B) are switching to generate $V_{mid}=2*V_{out}$ from the $V_{out}$ voltage source 202. Branches A and B are switching 180° out of phase.

During the first clock phase 330 (Clock Phase 1) shown in FIG. 3B, transistors $Q_{2A}$, $Q_{4A}$, $Q_{1B}$, and $Q_{3B}$ are on, while transistors $Q_{1A}$, $Q_{3A}$, $Q_{2B}$, and $Q_{4B}$ are off. Thus, current 332 flows from the $V_{out}$ voltage source 202 to charge the flying capacitive element in Branch A ($C_{flyA}$) through transistors $Q_{2A}$ and $Q_{4A}$, and current 334 flows from the $V_{out}$ voltage source 202 through the flying capacitive element in Branch B ($C_{flyB}$) and transistors $Q_{1B}$ and $Q_{3B}$ to charge $C_{mid}$ and $C_{in}$. With this configuration, $C_{flyA}$ is in parallel with the $V_{out}$ voltage source 202, such that the voltage at the CFH_A node ($V_{cfh\_A}=V_{cfly\_A}$) is equal to $V_{out}$. Also, $C_{flyB}$ is in series with the $V_{out}$ voltage source 202, and thus, $V_{mid}$ and $V_{in}$ are equal to $2*V_{out}$.

During the second clock phase 360 (Clock Phase 2) depicted in FIG. 3C, transistors $Q_{1A}$, $Q_{3A}$, $Q_{2B}$, and $Q_{4B}$ are on, while transistors $Q_{2A}$, $Q_{4A}$, $Q_{1B}$, and $Q_{3B}$ are off. Thus, current 362 flows from the $V_{out}$ voltage source 202 to charge $C_{flyB}$ through transistors $Q_{2B}$ and $Q_{4B}$, and current 364 flows from the $V_{out}$ voltage source 202 through $C_{flyA}$ and transistors $Q_{1A}$ and $Q_{3A}$ to charge $C_{mid}$ and $C_{in}$. In this configuration, $C_{flyB}$ is in parallel with the $V_{out}$ voltage source 202, such that the voltage at the CFH_B node ($V_{cfh\_B}=V_{cfly\_B}$) is equal to $V_{out}$. In addition, $C_{flyA}$ is in series with the $V_{out}$ voltage source 202, and thus, $V_{mid}$ and $V_{in}$ are equal to $2*V_{out}$.

If reverse X2 mode begins directly without any soft start, a large current may be drawn from the charge pump circuit (e.g., circuit 200 or 300) to charge up the input capacitor ($C_{in}$) and the MID capacitor ($C_{mid}$). Because the equivalent resistance ($R_{eq}$) of the charge pump circuit is very small, then by Ohm's law, the peak current is defined by $V_{out}/R_{eq}$, which may likely exceed the maximum current the power FETs $Q_1$-$Q_4$ can handle. This excessive current may cause switcher damage. Also, without soft start, the input voltage(s) will have a big jump, which may be undesirable in many applications.

Additionally, there could be some loading on the input caused by downstream receiver leakage. If the switcher proceeds to soft start with this loading, due to a current source headroom issue, the switcher may not be able to soft start to the desired level, which may then cause the soft start to fail. However, it may be desirable to load the $V_{in}$ node during an input voltage soft start. In one example implementation, a load switch (e.g., an external load switch) may be utilized to work with the charge pump circuit to perform the reverse X2 mode soft start.

Figure 4A:
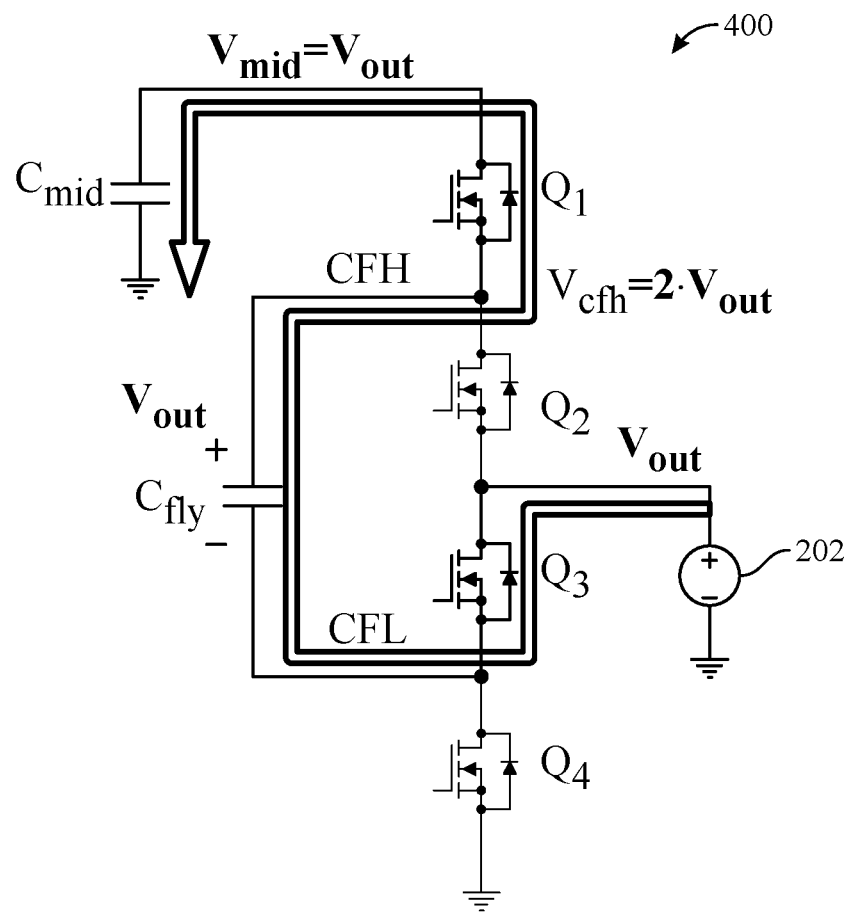
FIG. 4A illustrates an initial switching condition for a charge pump circuit without a soft start.
Figure 4B:
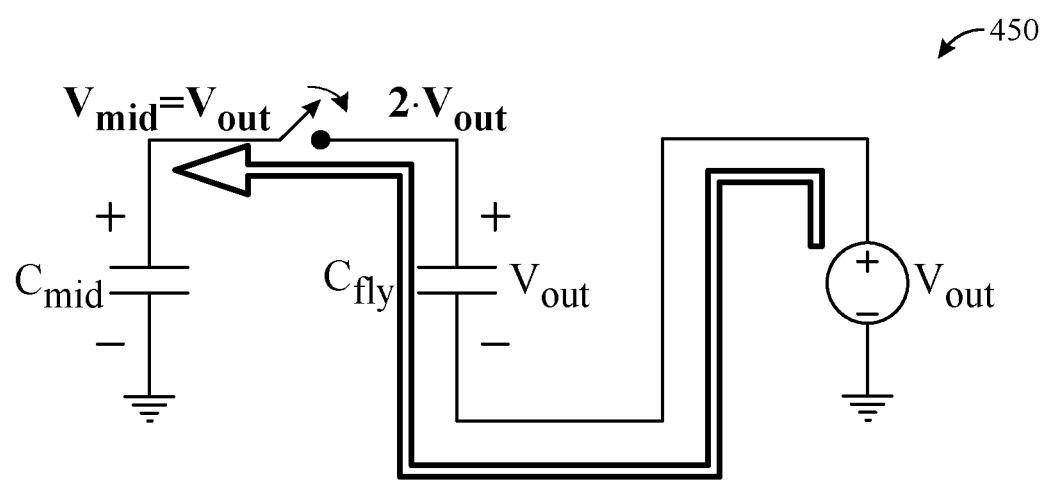
FIG. 4B is an equivalent circuit for the charge pump circuit of FIG. 4A.

FIG. 4A illustrates the challenges with a reverse X2 mode initial switching condition for a charge pump circuit 400 without a soft start. FIG. 4B is an equivalent circuit 450 for the charge pump circuit 400 of FIG. 4A.

Before start-up in reverse X2 mode, $V_{out}$ is the highest voltage. Thus, MID and $C_{fly}$ can be prebiased to $V_{out}$, but not higher without providing some other higher voltage supply. When the switcher starts switching, transistors $Q_1$ and $Q_3$ will turn on, $C_{fly}$ is connected in series with the $V_{out}$ voltage source 202, and Van is equal to $2*V_{out}$. However, $V_{mid}$ is only at $V_{out}$. Because a power FET's on-resistance ($r_{ds,on}$) is generally very small (~10 mΩ), a large current will be drawn from the switcher to charge up C a. This large current may far exceed the peak current the power FETs can handle. Thus, the switcher could be damaged in starting reverse X2 mode without a soft start feature.

Certain aspects of the present disclosure provide techniques and apparatus for soft starting a switched-mode power supply circuit capable of operating as a charge pump in a reverse X2 mode. Aspects of the present disclosure need not include any external device support (e.g., an external load switch).

Switcher soft start (also referred to as "MID node soft start") may be used to safely operate the charge pump in reverse X2 mode, without damaging the power FETs. Input ($V_{in}$) soft start may also be implemented (as described below), but after the switcher soft start is completed to eliminate the outside loading on the MID node during switcher soft start. This additional loading on the MID node might otherwise be problematic and could potentially cause the MID node soft start to fail, due to the current source headroom issue. Thus, the full charge pump reverse X2 mode soft start scheme may consist of the switcher soft start followed by the input soft start.

Figure 5A:
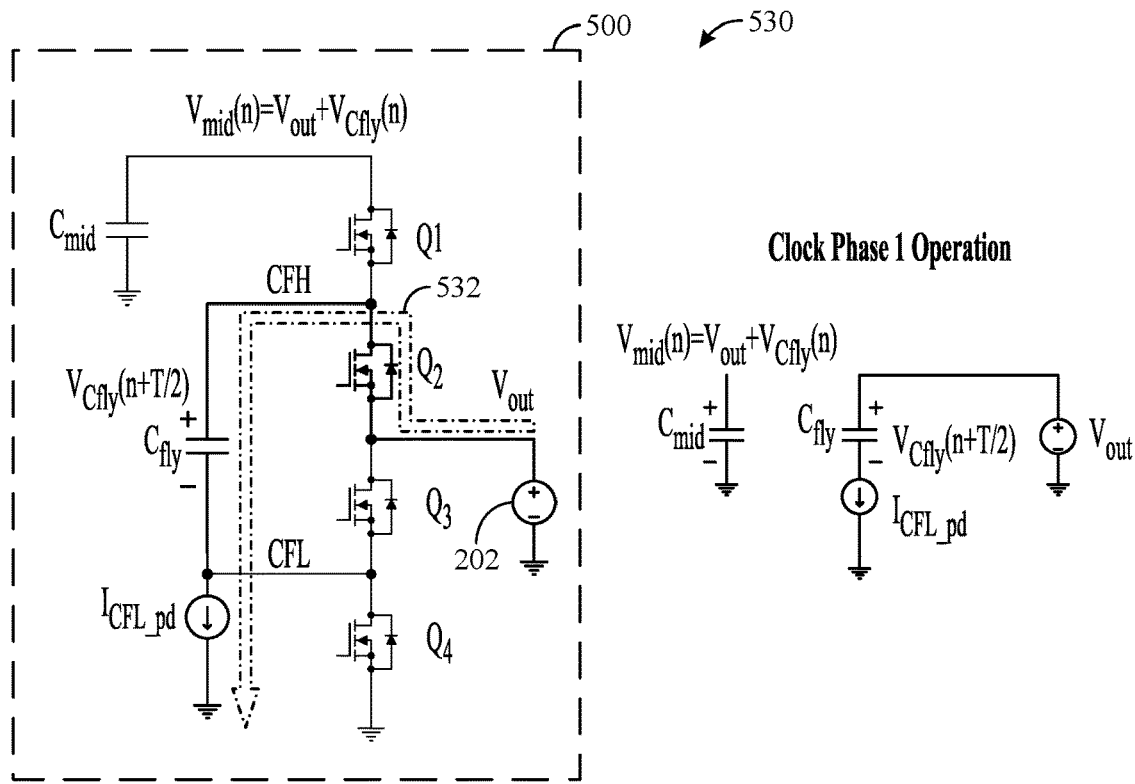
FIGS. 5A and 5B illustrate different soft start operation phases of a single branch charge pump circuit for a reverse X2 mode, in accordance with certain aspects of the present disclosure.
Figure 5B:
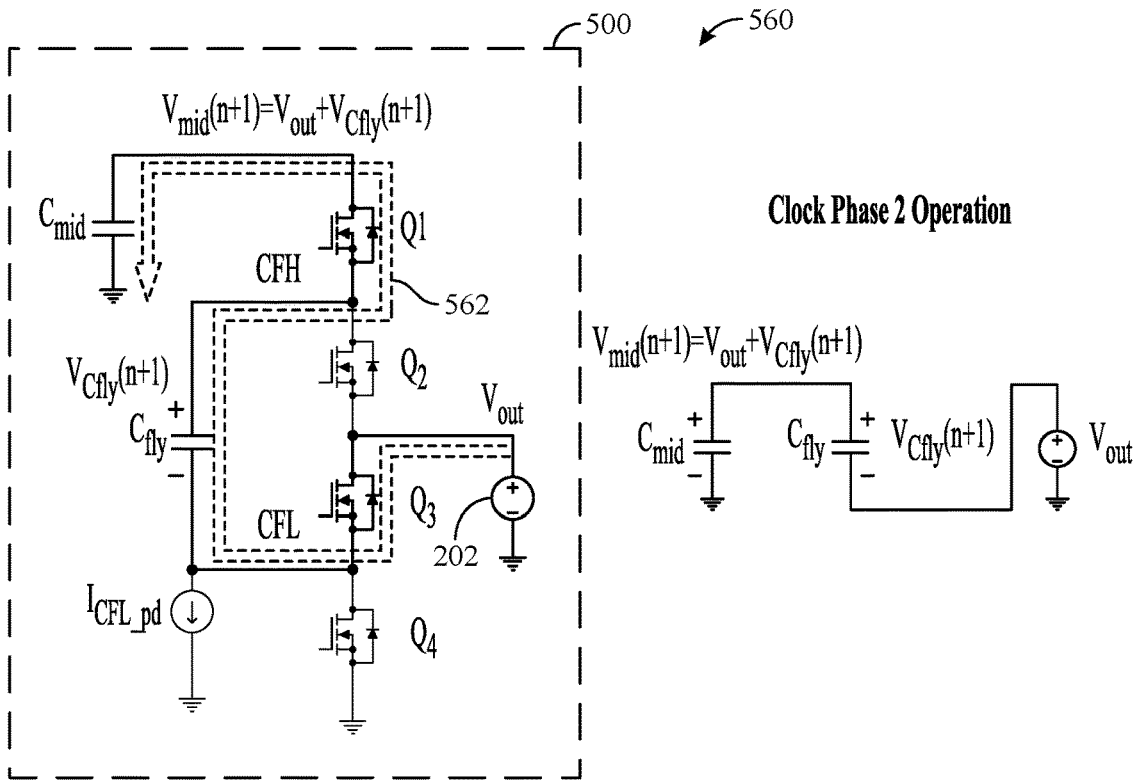
Figure 6:
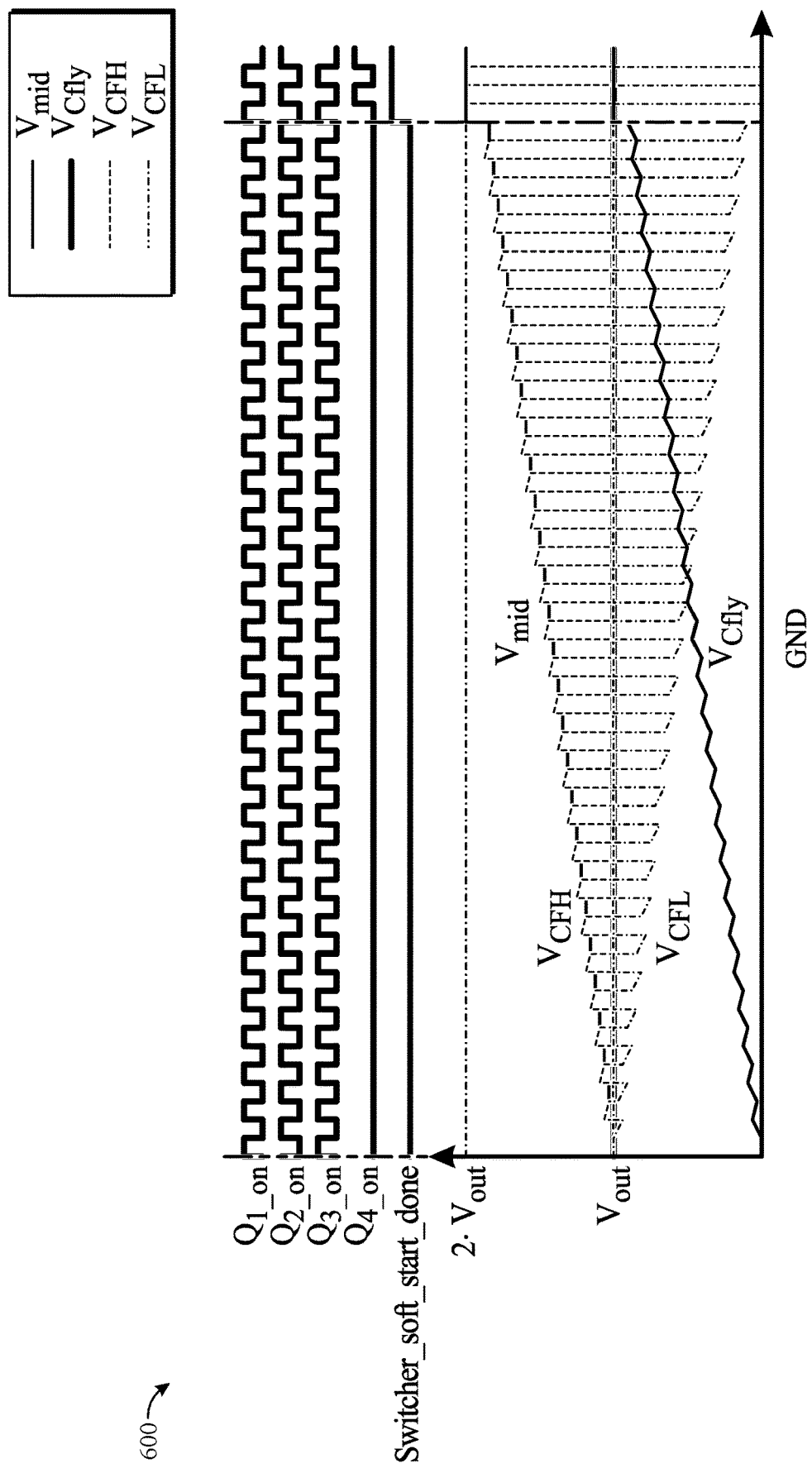
FIG. 6 is a graph of example waveforms for the soft start operation using the single branch charge pump circuit of FIGS. 5A and 5B, in accordance with certain aspects of the present disclosure.

FIGS. 5A and 5B illustrate different switcher soft start operation phases of a single branch charge pump circuit 500 for a reverse X2 mode, in accordance with certain aspects of the present disclosure. FIG. 6 is a graph 600 of example waveforms for the switcher soft start operation using the single branch charge pump circuit 500 of FIGS. 5A and 5B, in accordance with certain aspects of the present disclosure.

Before the switcher soft start, the charge pump circuit 500 may disconnect the MID node from the $V_{in}$ node (e.g., by turning off transistor $Q_{rbfet}$) and may pull up the MID node (e.g., by turning on transistors $Q_1$ and $Q_2$), thereby making $V_{mid}=V_{out}$. Furthermore, the charge pump circuit 500 may fully discharge $C_{fly}$, thereby making $V_{cfly}=0$ V. Then, the charge pump circuit 500 may proceed with the switcher soft start operation.

During the first clock phase 530 (Clock Phase 1) of the switcher soft start portrayed in FIG. 5A, transistor $Q_2$ and a CFL pulldown current source ($I_{CFL\_pd}$, also referred to as a current sink) are activated, transistors $Q_1$ and $Q_3$ are deactivated (turned off), and transistor $Q_4$ is (or stays) deactivated. $I_{CFL\_pd}$ is connected in parallel with transistor $Q_4$, as illustrated in FIGS. 5A and 5B. In this configuration, current 532 flows from the $V_{out}$ voltage source 202 to charge $C_{fly}$ through transistor $Q_2$ and is sunk by $I_{CFL\_pd}$. $V_{cfh}$ is initially equal to $V_{out}$. $I_{CFL\_pd}$ will charge up $C_{fly}$ to $V_{mid}(n+T/2)$, where T is a time duration of one period of adjacent Clock Phases 1 and 2 and n is an integer index for the period. The MID voltage remains equal to the previous phase, $V_{mid}(n+T/2)=V_{mid}(n)=V_{out}+V_{cfly}(n)$. These concepts are illustrated in the equivalent circuit adjacent to the schematic diagram illustrating the first clock phase 530.

During the second clock phase 560 (Clock Phase 2) of the switcher soft start shown in FIG. 5B, transistor $Q_2$ and $I_{CFL\_pd}$ are deactivated, transistors $Q_1$ and $Q_3$ are activated (turned on), and transistor $Q_4$ remains deactivated. With this configuration, current 562 flows from the $V_{out}$ voltage source 202 to charge $C_{mid}$ through $C_{fly}$ and transistors $Q_1$ and $Q_3$. $C_{fly}$ is in series with the $V_{out}$ voltage source 202, Van is equal to $V_{mid}$, $V_{cfl}$ is equal to $V_{out}$. The charge pump circuit 500 delivers power through transistors $Q_1$, $Q_3$, and $C_{fly}$ to the MID node, where $V_{mid}(n+1)=V_{out}+V_{cfly}(n+1)$. These concepts are also illustrated in the equivalent circuit adjacent to the schematic diagram illustrating the second clock phase 560.

In each subsequent clock cycle (one period of both Clock Phases 1 and 2) of the switcher soft start, the net charge on $C_{fly}$ increases, and $V_{cfly}$ and $V_{mid}$ increase, as well, as illustrated in the graph 600 of FIG. 6. In other words, $V_{cfly}(n+1)$ is generally greater than $V_{cfly}(n)$, and $V_{mid}(n+1)$ is generally greater than $V_{mid}(n)$. During the switcher soft start, transistor $Q_4$ stays off. After the switcher soft start is completed (e.g., because $V_{mid}$ is within a threshold voltage of $2*V_{out}$ or, stated another way, $V_{mid}$ is above a threshold level close to $2*V_{out}$), transistors $Q_1$, $Q_2$, $Q_3$, and $Q_4$ may begin steady state switching in the reverse X2 mode, as explained above with respect to FIGS. 2B and 2C. For certain aspects, when $V_{mid}$ is within a defined range of $2*V_{out}$, the switcher soft start is done (as indicated by the Switcher_soft_start_done signal transitioning states, such as from logic low to logic high), and then input soft start begins.

Figure 7:
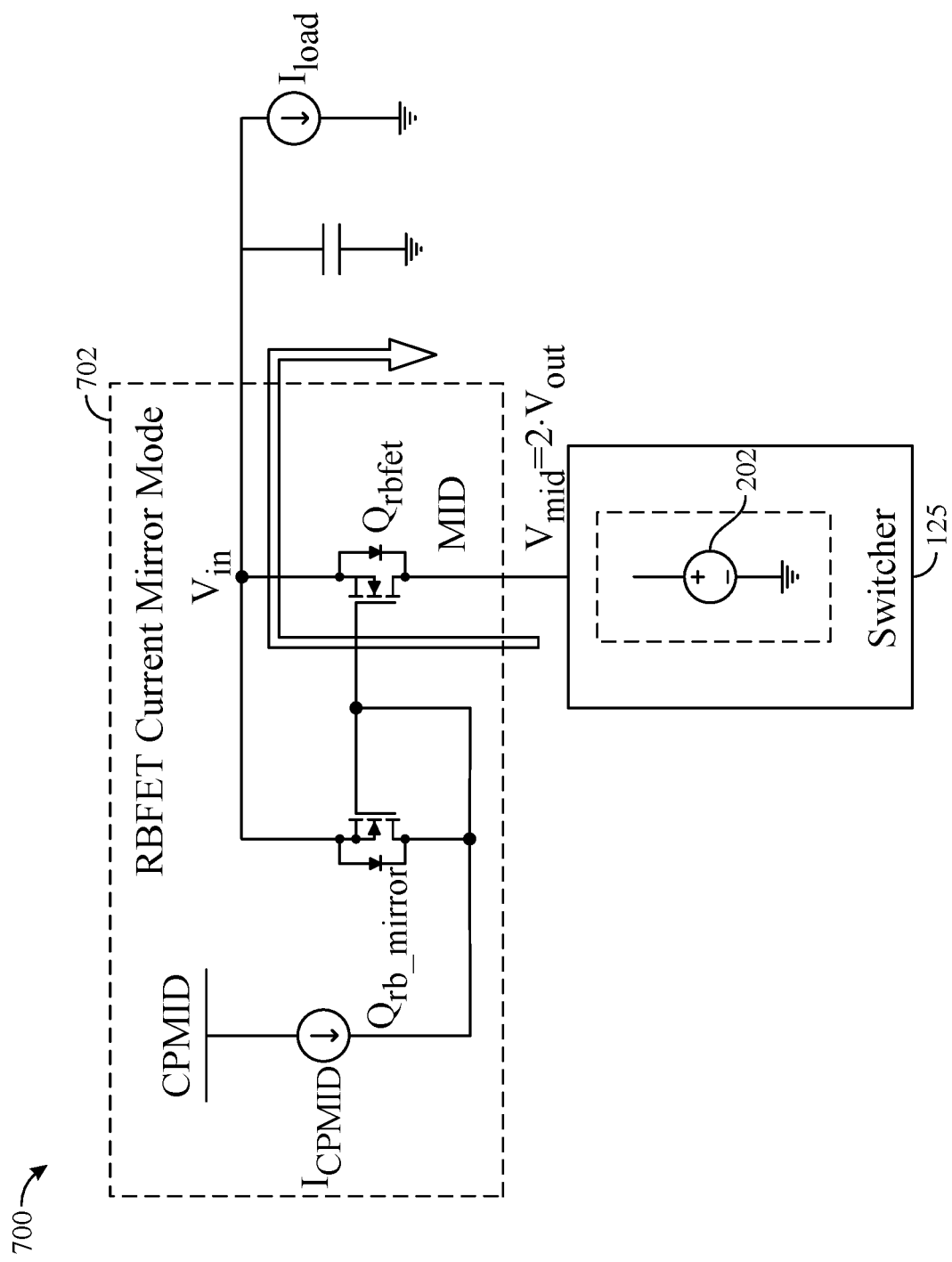
FIG. 7 illustrates an input voltage soft start operation of a charge pump circuit for a reverse X2 mode, in accordance with certain aspects of the present disclosure.

FIG. 7 illustrates an input voltage soft start operation 700 of a charge pump circuit (e.g., the single branch charge pump circuit 500) for a reverse X2 mode, in accordance with certain aspects of the present disclosure. After finishing the switcher soft start, the switcher (e.g., the switched-mode power supply circuit 125) may operate with steady-state switching, where $V_{mid}=2*V_{out}$. The MID node is now capable of delivering a relatively large current to the input (the $V_{in}$ node). In order to soft start the input voltage, the charge pump circuit may utilize transistor $Q_{rbfet}$ in a current mirror circuit 702, as illustrated in FIG. 7. The current mirror circuit 702 may also comprise a current source $I_{CPMID}$ and a transistor $Q_{rb\_mirror}$, which may normally be deactivated during steady state operation of the charge pump circuit. The current source $I_{CPMID}$ and the transistor $Q_{rb\_mirror}$ may be activated to configure the transistor $Q_{rbfet}$ as part of the current mirror. Transistor $Q_{rb\_mirror}$ may be a relatively small NMOS transistor which takes current from the CPMID power supply rail. The CPMID rail may be used to supply power to the switcher power stage drivers (i.e., CPMID is the power supply rail for the drivers driving the gates of the power FETs $Q_1$-$Q_4$). Both sources of transistors $Q_{rbfet}$ and $Q_{rb\_mirror}$ may be coupled to the input node ($V_{in}$), the gates of transistors $Q_{rbfet}$ and $Q_{rb\_mirror}$ may be coupled together and to the drain of transistor $Q_{rb\_mirror}$, which may also be coupled to the current source $I_{CPMID}$.

By utilizing this current mirror circuit 702, $V_{in}$ can be soft started to $2*V_{out}$ with a load (e.g., a current sink $I_{load}$) on the input voltage node. Once $V_{in}$ is within a defined range of $V_{mid}$ (e.g., $V_{in}$ is above a defined threshold voltage), transistor $Q_{rbfet}$ turns on fully and exits the current mirror mode (e.g., by deactivating the current source $I_{CPMID}$ and transistor $Q_{rb\_mirror}$ d). At this point, the input soft start is completed, and the charge pump circuit may commence with normal steady state operation in the reverse X2 mode.

Figure 8A:
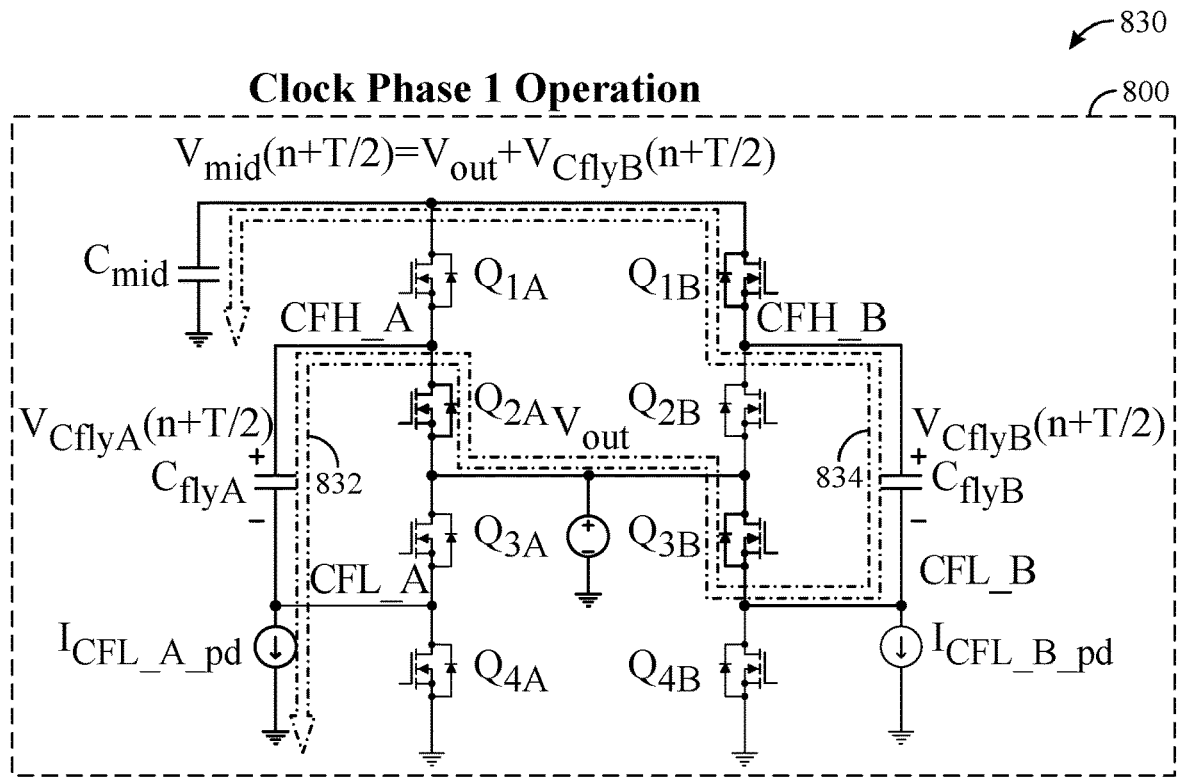
FIGS. 8A and 8B illustrate different soft start operation phases of a dual branch charge pump circuit for a reverse X2 mode, in accordance with certain aspects of the present disclosure.
Figure 8B:
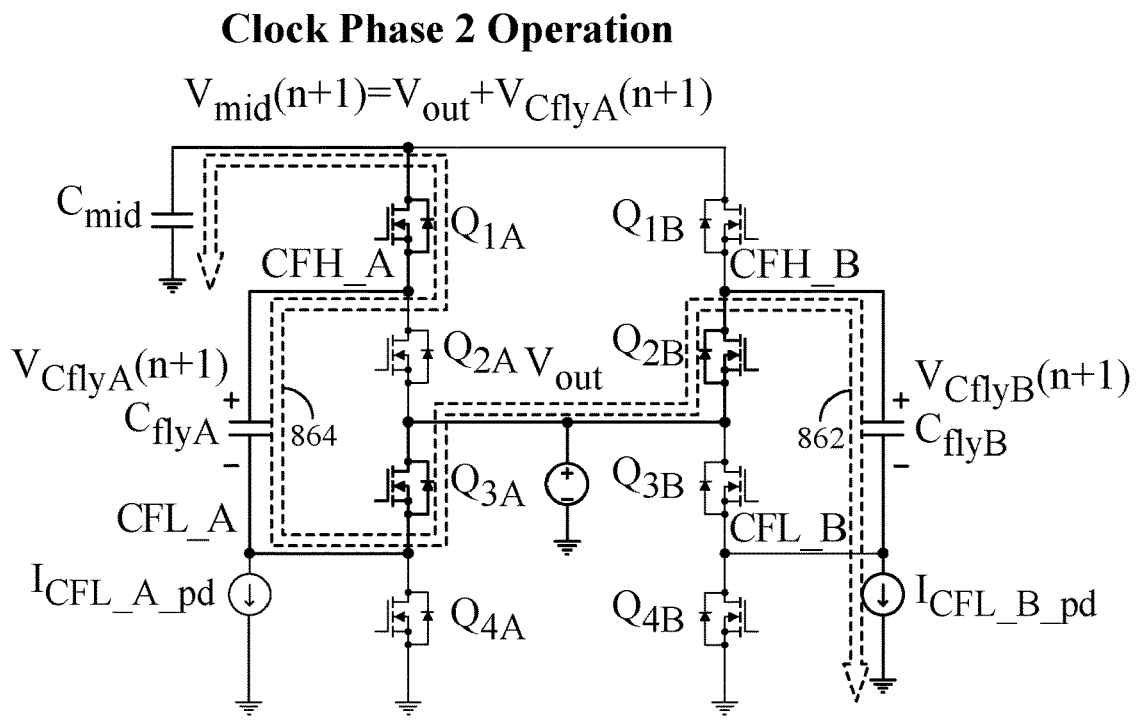
Figure 9:
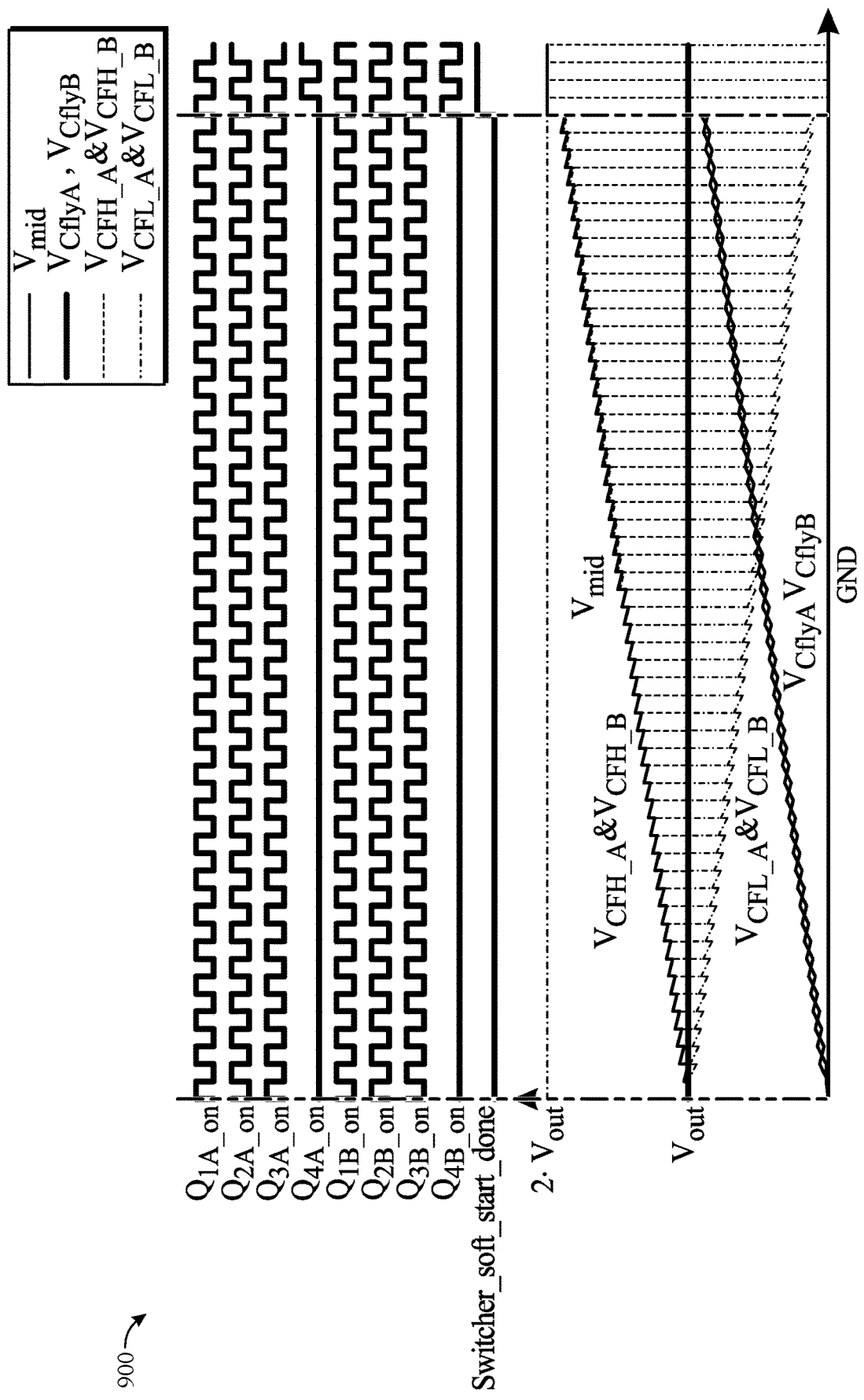
FIG. 9 is a graph of example waveforms for the soft start operation using the dual branch charge pump circuit of FIGS. 8A and 8B, in accordance with certain aspects of the present disclosure.

FIGS. 8A and 8B illustrate different switcher soft start operation phases of a dual branch charge pump circuit 800 for a reverse X2 mode, in accordance with certain aspects of the present disclosure. FIG. 9 is a graph 900 of example waveforms for the switcher soft start operation using the dual branch charge pump circuit 800 of FIGS. 8A and 8B, in accordance with certain aspects of the present disclosure.

Before the switcher soft start, the dual branch charge pump circuit 800 may disconnect the MID node from the $V_{in}$ node (e.g., by turning off transistor $Q_{rbfet}$) and may pull up the MID node (e.g., by turning on transistors $Q_{1A}$ and $Q_{2A}$ and/or transistors $Q_{1B}$ and $Q_2$B), thereby making $V_{mid}=V_{out}$. Furthermore, the dual branch charge pump circuit may fully discharge the $C_{flyA}$ and $C_{flyB}$ voltages, thereby making $V_{cflyA}=V_{cflyB}=0$ V. Then, the dual branch charge pump circuit may proceed with the switcher soft start operation.

During the first clock phase 830 (Clock Phase 1) of the switcher soft start depicted in FIG. 8A, transistor $Q_{2A}$ and CFL_A pulldown current source ($I_{CFL\_A\_pd}$) are activated, transistors $Q_{1A}$ and $Q_{3A}$ are deactivated (turned off), and transistor $Q_{4A}$ is (or remains) deactivated. With this configuration, current 832 flows from the $V_{out}$ voltage source 202 to charge $C_{flyA}$ through transistor $Q_{2A}$ and is sunk by $I_{CFL\_A\_pd}$. $V_{cfh\_A}$ is equal to $V_{out}$. $I_{CFL\_A\_pd}$ will charge up $C_{flyA}$ to $V_{cflyA}(n+T/2)$. Meanwhile, transistor $Q_{2B}$ and CFL_B pulldown current source ($I_{CFL\_B\_pd}$) are deactivated, transistors $Q_{1B}$ and $Q_3$B are activated, and transistor $Q_{4B}$ is (or remains) deactivated. In this configuration, current 834 flows from the $V_{out}$ voltage source 202 to charge Ca through $C_{flyB}$ and transistors $Q_{1B}$ and $Q_3$B. $C_{flyB}$ is in series with the $V_{out}$ voltage source 202, $V_{cfh\_B}$ is equal to $V_{mid}$, and $V_{cfl\_B}$ is equal to $V_{out}$. The dual branch charge pump circuit delivers power through transistors $Q_{1B}$, $Q_{3B}$, and $C_{flyB}$ to the MID node, where $V_{mid}(n+T/2)=V_{out}+V_{cflyB}(n+T/2)$.

During the second clock phase 860 (Clock Phase 2) of the switcher soft start shown in FIG. 8B, transistor $Q_{2B}$ and $I_{CFL\_B\_pd}$ are activated, transistors $Q_{1B}$ and $Q_{3B}$ are deactivated, and transistor $Q_{4B}$ remains deactivated. With this configuration, current 862 flows from the $V_{out}$ voltage source 202 to charge $C_{flyB}$ through transistor $Q_{2B}$ and is sunk by $I_{CFL\_B\_pd}$. $V_{cfh\_B}$ is equal to $V_{out}$. B_pd will charge up $C_{flyB}$ to $V_{cflyB}(n+1)$. Meanwhile, transistor $Q_{2A}$ and $I_{CFL\_A\_pd}$ are deactivated, transistors $Q_{1A}$ and $Q_{3A}$ are activated, and transistor $Q_{4A}$ remains deactivated. In this configuration, current 864 flows from the $V_{out}$ voltage source 202 to charge Ca through $C_{flyA}$ and transistors $Q_{1A}$ and $Q_{3A}$. $C_{flyA}$ is in series with the $V_{out}$ voltage source 202, $V_{cfh}$ A is equal to $V_{mid}$, and $V_{cfl\_A}$ is equal to $V_{out}$. The dual branch charge pump circuit delivers power through transistors $Q_{1A}$, $Q_{3A}$, and $C_{flyA}$ to the MID node, where $V_{mid}(n+1)=V_{out}+V_{cfly}(n+1)$.

In each subsequent clock cycle (one period comprising a Clock Phase 1 and a Clock Phase 2) of the switcher soft start, the net charge on $C_{flyA}$ and $C_{flyB}$ increases, and $V_{cflyA}$, $V_{cflyB}$, and $V_{mid}$ increase, as well, as illustrated in the graph 900 of FIG. 9. During the duration of the switcher soft start, both transistors $Q_{4A}$ and $Q_{4B}$ stay off. After the switcher soft start is completed (e.g., because $V_{mid}$ is within a threshold voltage of $2*V_{out}$), transistors $Q_{1A}$-$Q_{4A}$ and $Q_{1B}$-$Q_{4B}$ may begin steady state switching in the reverse X2 mode, as described above with respect to FIGS. 3B and 3C. For certain aspects, when $V_{mid}$ is within a defined range of $2*V_{out}$, the switcher soft start is complete, and then input soft start begins, as described above with respect to FIG. 7.

Example Operations for Supplying Power

Figure 10:
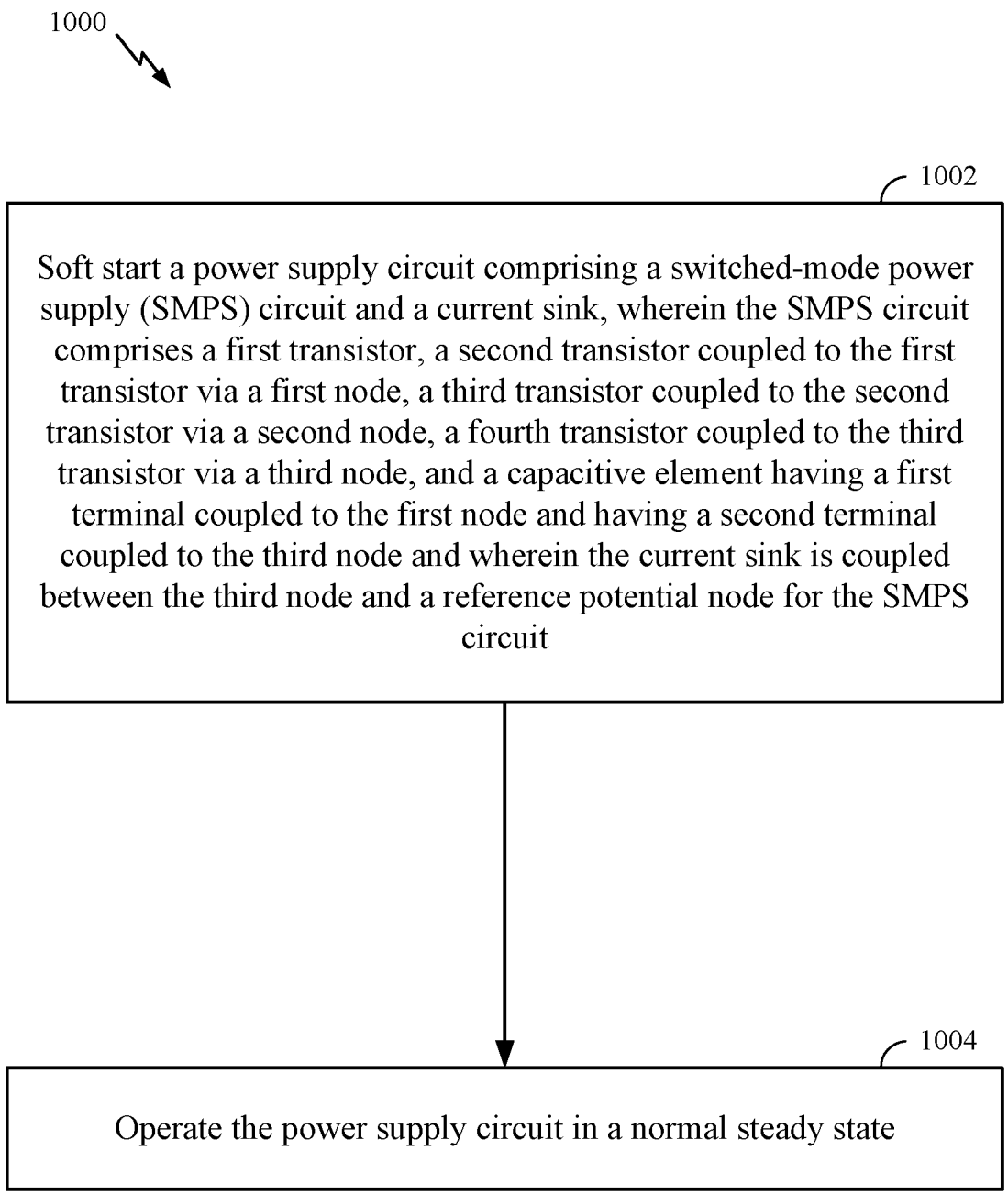
FIGS. 10 and 11 are flow diagrams of example operations for supplying power, in accordance with certain aspects of the present disclosure.

FIG. 10 is a flow diagram of example operations 1000 for supplying power, in accordance with certain aspects of the present disclosure. The operations 1000 may be performed by a power supply circuit (e.g., the charge pump circuit 500 or 800 of FIG. 5A-5B or 8A-8B, respectively).

The operations 1000 may begin, at block 1002, by soft starting the power supply circuit. The power supply circuit includes a switched-mode power supply circuit (e.g., the switched-mode power supply circuit 125) and a current sink (e.g., pull-down current source $I_{CFL\_pd}$). The switched-mode power supply circuit generally includes a first transistor (e.g., transistor $Q_1$), a second transistor (e.g., transistor $Q_2$) coupled to the first transistor via a first node (e.g., the CFH node), a third transistor (e.g., transistor $Q_3$) coupled to the second transistor via a second node (e.g., the $V_{out}$ node), a fourth transistor (e.g., transistor $Q_4$) coupled to the third transistor via a third node (e.g., the CFL node), and a capacitive element (e.g., $C_{fly}$) having a first terminal coupled to the first node and having a second terminal coupled to the third node. The current sink is coupled between the third node and a reference potential node (e.g., electrical ground) for the switched-mode power supply circuit. At block 1004, the power supply circuit operates in a normal steady state (e.g., in a forward Div2 mode or a reverse X2 mode).

According to certain aspects, the soft starting at block 1002 involves selectively enabling the current sink. For example, selectively enabling the current sink may entail enabling the current sink during a first phase (e.g., Clock Phase 1) of the soft starting and disabling the current sink during a second phase (e.g., Clock Phase 2) of the soft starting. The current sink may also be disabled during the normal steady state for the power supply circuit. For certain aspects, the soft starting at block 1002 further involves, during the first phase of the soft starting, turning off the first transistor, the third transistor, and the fourth transistor and turning on the second transistor, and during the second phase of the soft starting, turning on the first transistor and the third transistor and turning off the second transistor and the fourth transistor. In this case, the first transistor may be coupled between the first node and a fourth node, the fourth node may be configured as an output voltage node for the power supply circuit in a reverse mode, and/or the second node may be configured as an input voltage node for the power supply circuit in the reverse mode. In some instances, the soft starting at block 1002 further includes repeating the first phase and the second phase until a voltage at the fourth node ($V_{mid}$) is greater than a threshold voltage (or is within a defined range of $2*V_{out}$).

According to certain aspects, the operating at block 1004 entails disabling the current sink in the normal steady state.

According to certain aspects, the first transistor is coupled between the first node and a fourth node (e.g., the MID node), the fourth node is configured as a first output voltage node for the power supply circuit in a reverse mode, the power supply circuit further comprises a fifth transistor (e.g., transistor $Q_{rbfet}$) coupled between the fourth node and a fifth node (e.g., the $V_{in}$ node), and/or the fifth node is configured as a second output voltage node for the power supply circuit in the reverse mode. In this case, the soft starting at block 1002 may involve turning off the fifth transistor, turning on the first and second transistors to pull a first voltage at the first output voltage node up to a second voltage at the second node, and/or discharging the capacitive element. These processes may be performed before a switcher soft start operation begins. For certain aspects, the soft starting at block 1002 further involves performing a switcher soft start of the switched-mode power supply circuit, and in response to the first voltage at the first output voltage node being above the first threshold voltage, operating the switched-mode power supply circuit in a steady state for the reverse mode and performing an input soft start. For certain aspects, the power supply circuit further comprises a current mirror circuit (e.g., current mirror circuit 702) coupled between the fourth node and the fifth node, the fifth transistor is part of the current mirror circuit, and the current mirror circuit further comprises a current source (e.g., current source $I_{CPMID}$) and a sixth transistor (e.g., transistor $Q_{rb\_mirror}$) coupled between the fifth node and the current source. In this case, performing the input soft start may involve activating the current mirror circuit. For certain aspects, operating the power supply circuit in the normal steady state at block 1004 is in response to a third voltage (e.g., $V_{in}$) at the fifth node being above a second threshold voltage and comprises deactivating at least one of the current source or the sixth transistor.

According to certain aspects, the operating at block 1004 includes configuring the switched-mode power supply circuit as a multiply-by-two charge pump in a reverse mode.

Figure 11:
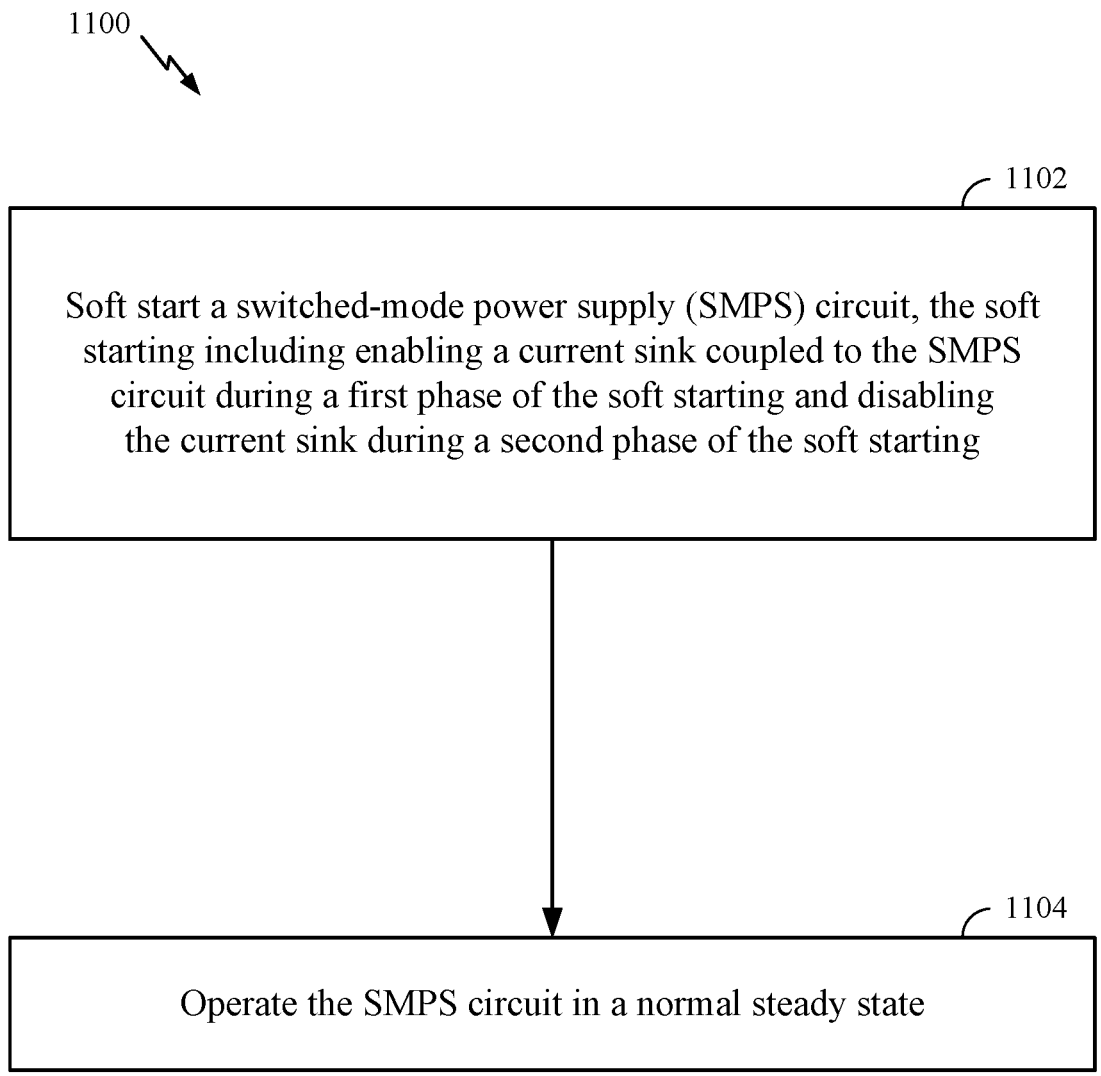

FIG. 11 is a flow diagram of example operations 1100 for supplying power, in accordance with certain aspects of the present disclosure. The operations 1100 may be performed by a power supply circuit (e.g., the charge pump circuit 500 or 800 of FIG. 5A-5B or 8A-8B, respectively).

The operations 1000 may begin, at block 1002, by soft starting a switched-mode power supply circuit (e.g., the switched-mode power supply circuit 125). The soft starting may include enabling a current sink (e.g., pull-down current source $I_{CFL\_pd}$) coupled to the switched-mode power supply circuit during a first phase (e.g., Clock Phase 1) of the soft starting and disabling the current sink during a second phase (e.g., Clock Phase 2) of the soft starting. At block 1104, the switched-mode power supply circuit operates in a normal steady state (e.g., in a forward Div2 mode or a reverse X2 mode).

According to certain aspects, the soft starting at block 1102 further includes repeating the first phase and the second phase until a voltage (e.g., $V_{mid}$) at an output voltage node for the switched-mode power supply circuit in a reverse mode is greater than a threshold voltage (e.g., of $2*V_{out}$, or is within a defined range of $2*V_{out}$).

Conclusion

Certain aspects of the present disclosure provide a practical way to soft start the MID node voltage ($V_{mid}$) from $V_{out}$ to $2*V_{out}$ and soft start the input node voltage ($V_{in}$) from 0 V to $2*V_{out}$ in reverse X2 mode charge pump operation. Certain aspects of the present disclosure prevent charge pump power stage damage by excessive current without soft start, and also avoid big MID and input voltage changes during reverse X2 start up without soft start. Additionally, certain aspects of the present disclosure may start up with some loading on the input, which may be caused by the leakage of a downstream receiver. Certain aspects of the present disclosure integrate the reverse X2 soft start feature into the charge pump circuit, thereby dispensing with an external load switch to support the soft start for reverse X2 mode.

Example Aspects

In addition to the various aspects described above, specific combinations of aspects are within the scope of the disclosure, some of which are detailed below:

Aspect 1: A power supply circuit comprising: a switched-mode power supply circuit comprising a first transistor, a second transistor coupled to the first transistor via a first node, a third transistor coupled to the second transistor via a second node, a fourth transistor coupled to the third transistor via a third node, and a capacitive element having a first terminal coupled to the first node and having a second terminal coupled to the third node; and a current sink coupled between the third node and a reference potential node for the switched-mode power supply circuit.

Aspect 2: The power supply circuit of Aspect 1, wherein the current sink is configured to be selectively enabled.

Aspect 3: The power supply circuit according to Aspect 1 or 2, wherein the current sink is configured to be enabled during a first phase of a soft start operation for the power supply circuit and wherein the current sink is configured to be disabled during a second phase of the soft start operation and during a normal operation for the power supply circuit.

Aspect 4: The power supply circuit of Aspect 3, wherein: during the first phase of the soft start operation, the first transistor, the third transistor, and the fourth transistor are configured to be turned off and the second transistor is configured to be turned on; and during the second phase of the soft start operation, the first transistor and the third transistor are configured to be turned on and the second transistor and the fourth transistor are configured to be turned off.

Aspect 5: The power supply circuit of Aspect 3, wherein the fourth transistor is configured to be disabled during the first and second phases of the soft start operation for the power supply circuit.

Aspect 6: The power supply circuit according to any of Aspects 1-5, wherein the first transistor is coupled between a fourth node and the first node, wherein the fourth node is configured as a first output voltage node for the power supply circuit in a reverse mode, and wherein the second node is configured as an input voltage node for the power supply circuit in the reverse mode.

Aspect 7: The power supply circuit of Aspect 6, further comprising a fifth transistor coupled between the fourth node and a fifth node, wherein the fifth node is configured as a second output voltage node for the power supply circuit in the reverse mode.

Aspect 8: The power supply circuit according to any of Aspects 1-7, wherein the switched-mode power supply circuit is selectively configured as a divide-by-two charge pump in a forward mode.

Aspect 9: The power supply circuit according to any of Aspects 1-8, wherein the switched-mode power supply circuit is selectively configured as a multiply-by-two charge pump in a reverse mode.

Aspect 10: The power supply circuit according to any of Aspects 1-9, further comprising a reverse-blocking transistor coupled between the first transistor and an output voltage node for the power supply circuit in a (or the) reverse mode.

Aspect 11: The power supply circuit according to any of Aspects 1-10, further comprising a current mirror circuit coupled between the first transistor and an (or the) output voltage node for the power supply circuit for a (or the) reverse mode.

Aspect 12: The power supply circuit of Aspect 11, wherein the current mirror circuit comprises: a fifth transistor coupled between the first transistor and the output voltage node, a current source, and a sixth transistor coupled between the output voltage node and the current source.

Aspect 13: The power supply circuit of Aspect 12, wherein at least one of the current source or the sixth transistor is configured to be selectively deactivated in a normal operation for the power supply circuit in the reverse mode and wherein the current source and the sixth transistor are configured to be activated in an input soft start operation for the power supply circuit in the reverse mode.

Aspect 14: The power supply circuit of Aspect 12, wherein a drain of the sixth transistor is coupled to the current source, to a gate of the sixth transistor, and to a gate of the fifth transistor; wherein a source of the sixth transistor is coupled to the output voltage node; and wherein a source of the fifth transistor is coupled to the output voltage node.

Aspect 15: The power supply circuit according to any of Aspects 1-14, wherein a drain of the second transistor is coupled to a source of the first transistor, wherein a drain of the third transistor is coupled to a source of the second transistor, wherein a drain of the fourth transistor is coupled to a source of the third transistor, and wherein the first, second, third, and fourth transistors comprise n-type metal-oxide-semiconductor (NMOS) transistors.

Aspect 16: The power supply according to any of Aspects 1 or 6-15, wherein the current sink is configured to be enabled during a first phase of a soft start operation for the power supply circuit and wherein the current sink is configured to be disabled during a second phase of the soft start operation and during a normal operation for the power supply circuit.

Aspect 17: The power supply circuit according to any of Aspects 1-16, wherein the fourth transistor is configured to be disabled during a soft start operation for the power supply circuit.

Aspect 18: A method of supplying power, comprising: soft starting a power supply circuit comprising: a switched-mode power supply circuit comprising: a first transistor; a second transistor coupled to the first transistor via a first node; a third transistor coupled to the second transistor via a second node; a fourth transistor coupled to the third transistor via a third node; and a capacitive element having a first terminal coupled to the first node and having a second terminal coupled to the third node; and a current sink coupled between the third node and a reference potential node for the switched-mode power supply circuit; and operating the power supply circuit in a normal steady state.

Aspect 19: The method of Aspect 18, wherein the soft starting comprises selectively enabling the current sink.

Aspect 20: The method of Aspect 19, wherein selectively enabling the current sink comprises: enabling the current sink during a first phase of the soft starting and disabling the current sink during a second phase of the soft starting.

Aspect 21: The method of Aspect 20, wherein the soft starting further comprises: during the first phase of the soft starting, turning off the first transistor, the third transistor, and the fourth transistor and turning on the second transistor; and during the second phase of the soft starting, turning on the first transistor and the third transistor and turning off the second transistor and the fourth transistor.

Aspect 22: The method of Aspect 21, wherein: the first transistor is coupled between the first node and a fourth node; the fourth node is configured as an output voltage node for the power supply circuit in a reverse mode; the second node is configured as an input voltage node for the power supply circuit in the reverse mode; and the soft starting further comprises repeating the first phase and the second phase until a voltage at the fourth node is greater than a threshold voltage.

Aspect 23: The method according to any of Aspects 18-22, wherein the operating comprises disabling the current sink in the normal steady state.

Aspect 24: The method according to any of Aspects 18-23, wherein: the first transistor is coupled between the first node and a fourth node; the fourth node is configured as a first output voltage node for the power supply circuit in a reverse mode; the power supply circuit further comprises a fifth transistor coupled between the fourth node and a fifth node; the fifth node is configured as a second output voltage node for the power supply circuit in the reverse mode; and the soft starting comprises: turning off the fifth transistor; turning on the first and second transistors to pull a first voltage at the first output voltage node up to a second voltage at the second node; and discharging the capacitive element.

Aspect 25: The method of Aspect 24, wherein the soft starting further comprises: performing a switcher soft start of the switched-mode power supply circuit; and in response to the first voltage at the first output voltage node being above a first threshold voltage, operating the switched-mode power supply circuit in a steady state for the reverse mode and performing an input soft start of the power supply circuit.

Aspect 26: The method of Aspect 25, wherein: the power supply circuit further comprises a current mirror circuit coupled between the fourth node and the fifth node; the fifth transistor is part of the current mirror circuit; the current mirror circuit further comprises a current source and a sixth transistor coupled between the fifth node and the current source; and performing the input soft start comprises activating the current mirror circuit.

Aspect 27: The method of Aspect 26, wherein operating the power supply circuit in the normal steady state is in response to a third voltage at the fifth node being above a second threshold voltage and comprises deactivating at least one of the current source or the sixth transistor.

Aspect 28: The method according to any of Aspects 18-27, wherein the operating comprises configuring the switched-mode power supply circuit as a multiply-by-two charge pump in a reverse mode.

Aspect 29: A method of supplying power, comprising: soft starting a switched-mode power supply circuit, the soft starting including: enabling a current sink coupled to the switched-mode power supply circuit during a first phase of the soft starting; and disabling the current sink during a second phase of the soft starting; and operating the switched-mode power supply circuit in a normal steady state.

Aspect 30: The method of Aspect 29, wherein the soft starting further includes repeating the first phase and the second phase until a voltage at an output voltage node for the switched-mode power supply circuit in a reverse mode is greater than a threshold voltage.

The various operations of methods described above may be performed by any suitable means capable of performing the corresponding functions. The means may include various hardware and/or software component(s) and/or module (s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A power supply circuit comprising:
   a switched-mode power supply circuit comprising:
   a first transistor;
   a second transistor coupled to the first transistor via a first node;
   a third transistor coupled to the second transistor via a second node, wherein the second node is configured as an output voltage node in a forward mode for the power supply circuit;
   a fourth transistor coupled to the third transistor via a third node; and
   a capacitive element having a first terminal coupled to the first node and having a second terminal coupled to the third node; and
   a current sink coupled between the third node and a reference potential node for the switched-mode power supply circuit.

2. The power supply circuit of claim 1, wherein the current sink is configured to be selectively enabled.

3. The power supply circuit of claim 2, wherein the current sink is configured to be enabled during a first phase of a soft start operation for the power supply circuit and wherein the current sink is configured to be disabled during a second phase of the soft start operation and during a normal operation for the power supply circuit.

4. The power supply circuit of claim 1, further comprising a reverse-blocking transistor coupled between the first transistor and an output voltage node for the power supply circuit in a reverse mode.

5. The power supply circuit of claim 1, further comprising a current mirror circuit coupled between the first transistor and an output voltage node for the power supply circuit for a reverse mode.

6. The power supply circuit of claim 5, wherein the current mirror circuit comprises:
   a fifth transistor coupled between the first transistor and the output voltage node;
   a current source; and
   a sixth transistor coupled between the output voltage node and the current source.

7. The power supply circuit of claim 6, wherein at least one of the current source or the sixth transistor is configured to be selectively deactivated in a normal operation for the power supply circuit in the reverse mode and wherein the current source and the sixth transistor are configured to be activated in an input soft start operation for the power supply circuit in the reverse mode.

8. The power supply circuit of claim 6, wherein:
a drain of the sixth transistor is coupled to the current source, to a gate of the sixth transistor, and to a gate of the fifth transistor;
a source of the sixth transistor is coupled to the output voltage node; and
a source of the fifth transistor is coupled to the output voltage node.

9. The power supply circuit of claim 1, wherein:
a drain of the second transistor is coupled to a source of the first transistor;
a drain of the third transistor is coupled to a source of the second transistor;
a drain of the fourth transistor is coupled to a source of the third transistor; and
the first, second, third, and fourth transistors comprise n-type metal-oxide-semiconductor (NMOS) transistors.

10. The power supply circuit of claim 1, wherein:
the current sink is configured to be enabled during a first phase of a soft start operation for the power supply circuit; and
the current sink is configured to be disabled during a second phase of the soft start operation and during a normal operation for the power supply circuit.

11. The power supply circuit of claim 1, wherein the fourth transistor is configured to be disabled during a soft start operation for the power supply circuit.

12. A power supply circuit comprising:
a switched-mode power supply circuit comprising:
a first transistor;
a second transistor coupled to the first transistor via a first node;
a third transistor coupled to the second transistor via a second node;
a fourth transistor coupled to the third transistor via a third node; and
a capacitive element having a first terminal coupled to the first node and having a second terminal coupled to the third node; and
a current sink coupled between the third node and a reference potential node for the switched-mode power supply circuit, wherein:
the current sink is configured to be selectively enabled;
the current sink is configured to be enabled during a first phase of a soft start operation for the power supply circuit;
the current sink is configured to be disabled during a second phase of the soft start operation and during a normal operation for the power supply circuit;
during the first phase of the soft start operation, the first transistor, the third transistor, and the fourth transistor are configured to be turned off and the second transistor is configured to be turned on; and
during the second phase of the soft start operation, the first transistor and the third transistor are configured to be turned on and the second transistor and the fourth transistor are configured to be turned off.

13. A power supply circuit comprising:
a switched-mode power supply circuit comprising:
a first transistor;
a second transistor coupled to the first transistor via a first node;
a third transistor coupled to the second transistor via a second node;
a fourth transistor coupled to the third transistor via a third node; and
a capacitive element having a first terminal coupled to the first node and having a second terminal coupled to the third node; and
a current sink coupled between the third node and a reference potential node for the switched-mode power supply circuit, wherein:
the current sink is configured to be selectively enabled;
the current sink is configured to be enabled during a first phase of a soft start operation for the power supply circuit;
the current sink is configured to be disabled during a second phase of the soft start operation and during a normal operation for the power supply circuit; and
the fourth transistor is configured to be disabled during the first and second phases of the soft start operation for the power supply circuit.

14. A power supply circuit comprising:
a switched-mode power supply circuit comprising:
a first transistor;
a second transistor coupled to the first transistor via a first node;
a third transistor coupled to the second transistor via a second node;
a fourth transistor coupled to the third transistor via a third node; and
a capacitive element having a first terminal coupled to the first node and having a second terminal coupled to the third node; and
a current sink coupled between the third node and a reference potential node for the switched-mode power supply circuit, wherein:
the first transistor is coupled between a fourth node and the first node;
the fourth node is configured as a first output voltage node for the power supply circuit in a reverse mode; and
the second node is configured as an input voltage node for the power supply circuit in the reverse mode.

15. The power supply circuit of claim 14, further comprising a fifth transistor coupled between the fourth node and a fifth node, wherein the fifth node is configured as a second output voltage node for the power supply circuit in the reverse mode.

16. A power supply circuit comprising:
a switched-mode power supply circuit comprising:
a first transistor;
a second transistor coupled to the first transistor via a first node;
a third transistor coupled to the second transistor via a second node;
a fourth transistor coupled to the third transistor via a third node; and
a capacitive element having a first terminal coupled to the first node and having a second terminal coupled to the third node; and
a current sink coupled between the third node and a reference potential node for the switched-mode power supply circuit, wherein the switched-mode power supply circuit is selectively configured as a divide-by-two charge pump in a forward mode.

17. The power supply circuit of claim 16, wherein the switched-mode power supply circuit is selectively configured as a multiply-by-two charge pump in a reverse mode.

18. A method of supplying power, comprising:
soft starting a power supply circuit comprising:
- a switched-mode power supply circuit comprising:
  - a first transistor;
  - a second transistor coupled to the first transistor via a first node;
  - a third transistor coupled to the second transistor via a second node, wherein the second node is configured as an output voltage node in a forward mode for the power supply circuit;
  - a fourth transistor coupled to the third transistor via a third node; and
  - a capacitive element having a first terminal coupled to the first node and having a second terminal coupled to the third node; and
- a current sink coupled between the third node and a reference potential node for the switched-mode power supply circuit; and operating the power supply circuit in a normal steady state.

19. The method of claim 18, wherein the soft starting comprises selectively enabling the current sink.

20. The method of claim 19, wherein selectively enabling the current sink comprises:
enabling the current sink during a first phase of the soft starting; and
disabling the current sink during a second phase of the soft starting.

21. The method of claim 18, wherein the operating comprises disabling the current sink in the normal steady state.

22. The method of claim 18, wherein the operating comprises configuring the switched-mode power supply circuit as a multiply-by-two charge pump in a reverse mode.

23. A method of supplying power, comprising:
soft starting a power supply circuit comprising:
- a switched-mode power supply circuit comprising:
  - a first transistor;
  - a second transistor coupled to the first transistor via a first node;
  - a third transistor coupled to the second transistor via a second node;
  - a fourth transistor coupled to the third transistor via a third node; and
  - a capacitive element having a first terminal coupled to the first node and having a second terminal coupled to the third node; and
- a current sink coupled between the third node and a reference potential node for the switched-mode power supply circuit, wherein the soft starting comprises:
  - selectively enabling the current sink, the selectively enabling comprising:
    - enabling the current sink during a first phase of the soft starting; and
    - disabling the current sink during a second phase of the soft starting;
  - during the first phase of the soft starting, turning off the first transistor, the third transistor, and the fourth transistor and turning on the second transistor; and
  - during the second phase of the soft starting, turning on the first transistor and the third transistor and turning off the second transistor and the fourth transistor; and operating the power supply circuit in a normal steady state.

24. The method of claim 23, wherein:
the first transistor is coupled between the first node and a fourth node;
the fourth node is configured as an output voltage node for the power supply circuit in a reverse mode;
the second node is configured as an input voltage node for the power supply circuit in the reverse mode; and
the soft starting further comprises repeating the first phase and the second phase until a voltage at the fourth node is greater than a threshold voltage.

25. A method of supplying power, comprising:
soft starting a power supply circuit comprising:
- a switched-mode power supply circuit comprising:
  - a first transistor;
  - a second transistor coupled to the first transistor via a first node;
  - a third transistor coupled to the second transistor via a second node;
  - a fourth transistor coupled to the third transistor via a third node; and
  - a capacitive element having a first terminal coupled to the first node and having a second terminal coupled to the third node; and
- a current sink coupled between the third node and a reference potential node for the switched-mode power supply circuit; and operating the power supply circuit in a normal steady state, wherein:
the first transistor is coupled between the first node and a fourth node;
the fourth node is configured as a first output voltage node for the power supply circuit in a reverse mode;
the power supply circuit further comprises a fifth transistor coupled between the fourth node and a fifth node;
the fifth node is configured as a second output voltage node for the power supply circuit in the reverse mode; and
the soft starting comprises:
  turning off the fifth transistor;
  turning on the first and second transistors to pull a first voltage at the first output voltage node up to a second voltage at the second node; and
  discharging the capacitive element.

26. The method of claim 25, wherein the soft starting further comprises:
performing a switcher soft start of the switched-mode power supply circuit; and
in response to the first voltage at the first output voltage node being above a first threshold voltage, operating the switched-mode power supply circuit in a steady state for the reverse mode and performing an input soft start of the power supply circuit.

27. The method of claim 26, wherein:
the power supply circuit further comprises a current mirror circuit coupled between the fourth node and the fifth node;
the fifth transistor is part of the current mirror circuit;
the current mirror circuit further comprises a current source and a sixth transistor coupled between the fifth node and the current source; and
performing the input soft start comprises activating the current mirror circuit.

28. The method of claim 27, wherein operating the power supply circuit in the normal steady state is in response to a third voltage at the fifth node being above a second threshold voltage and comprises deactivating at least one of the current source or the sixth transistor.

29. A method of supplying power, comprising:
   soft starting a switched-mode power supply circuit, the soft starting including:
      enabling a current sink coupled to the switched-mode power supply circuit during a first phase of the soft starting; and
      disabling the current sink during a second phase of the soft starting; and
   operating the switched-mode power supply circuit in a normal steady state, wherein the operating comprises configuring the switched-mode power supply circuit as a divide-by-two charge pump in a forward mode.

30. The method of claim 29, wherein the soft starting further includes repeating the first phase and the second phase until a voltage at an output voltage node for the switched-mode power supply circuit in a reverse mode is greater than a threshold voltage.

\* \* \* \* \*